US012763585B2

(12) United States Patent
Li

(10) Patent No.: US 12,763,585 B2
(45) Date of Patent: Oct. 13, 2026

(54) CHARGER

(71) Applicant: VIVO MOBILE COMMUNICATION CO., LTD., Dongguan (CN)

(72) Inventor: Dahuan Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 693 days.

(21) Appl. No.: 18/217,486

(22) Filed: Jun. 30, 2023

(65) Prior Publication Data

US 2023/0344264 A1 Oct. 26, 2023

Related U.S. Application Data

(63) Continuation of application No. PCT/CN2021/141518, filed on Dec. 27, 2021.

(30) Foreign Application Priority Data

Dec. 31, 2020 (CN) ......................... 202011627315.0

(51) Int. Cl.
*H02J 7/06* (2006.01)
*H02M 1/00* (2006.01)
*H02M 3/335* (2006.01)

(52) U.S. Cl.
CPC ............. *H02J 7/06* (2013.01); *H02M 1/0058* (2021.05); *H02M 3/33523* (2013.01); *H02M 3/33592* (2013.01)

(58) Field of Classification Search
CPC .... H02J 7/06; H02M 1/0058; H02M 3/33523; H02M 3/33592

(Continued)

(56) References Cited

U.S. PATENT DOCUMENTS 5,559,684 A 9/1996 Ohms et al.
8,009,448 B2 8/2011 Liu
(Continued)

FOREIGN PATENT DOCUMENTS

CN 200966023 Y 10/2007
CN 102624245 A 8/2012
(Continued)

OTHER PUBLICATIONS

Extended European Search Report issued in related European Application No. 21914233.8, mailed Jun. 14, 2024, 10 pages.
(Continued)

*Primary Examiner* — Daniel A Hess
(74) *Attorney, Agent, or Firm* — IPX PLLC

(57) ABSTRACT

A charger is provided. The charger includes: a first power input end, a second power input end, a power output end, a switching module, and a transformer. The switching module is separately connected to the first power input end and the second power input end. A primary side of the transformer is provided with a first resonant unit connected to the switching module. A secondary-side winding of the transformer is connected to the power output end. The switching module is capable of switching between a first on state and a second on state. When the switching module is in the first on state, input power at the first power input end is coupled to the secondary-side winding through the first resonant unit and is output through the power output end.

12 Claims, 5 Drawing Sheets

(58) Field of Classification Search
USPC .......................................................... 320/137
See application file for complete search history.

(56) References Cited

U.S. PATENT DOCUMENTS

| | | | | |
|---|---|---|---|---|
| 11,811,327 | B2 * | 11/2023 | Li | H02M 3/155 |
| 2005/0068792 | A1 | 3/2005 | Yasumura | |
| 2018/0262116 | A1 | 9/2018 | Ouyang | |
| 2020/0076314 | A1 | 3/2020 | Hayasaki | |
| 2023/0353057 | A1 * | 11/2023 | Li | H02J 7/933 |

FOREIGN PATENT DOCUMENTS

| | | | |
|---|---|---|---|
| CN | 205753505 | U | 11/2016 |
| CN | 106208401 | A | 12/2016 |
| CN | 108429356 | A | 8/2018 |
| CN | 109995242 | A | 7/2019 |
| CN | 110401354 | A | 11/2019 |
| CN | 112821482 | A | 5/2021 |
| CN | 112821483 | A | 5/2021 |
| JP | 2018148663 | A | 9/2018 |

OTHER PUBLICATIONS

International Search Report issued in corresponding International Application No. PCT/CN2021/141518, mailed Mar. 4, 2022, 6 pages.

First Office Action issued in related Chinese Application No. 202011627315.0, mailed Jan. 10, 2023, 4 pages.

* cited by examiner

CHARGER

CROSS-REFERENCE TO RELATED APPLICATIONS

This application is a continuation of International Application No. PCT/CN2021/141518, filed on Dec. 27, 2021, which claims priority to Chinese Patent Application No. 202011627315.0, filed on Dec. 31, 2020. The entire contents of each of the above-referenced applications are expressly incorporated herein by reference.

TECHNICAL FIELD

This application relates to the technical field of electronic products, and in particular, to a charger.

BACKGROUND

With the development of fast charging technologies, a multi-battery series charging technology and a half-voltage charging technology have gradually become main directions of existing charging technologies. For example, a charging detection voltage of an electronic device such as a mobile phone is 5V. This requires that a default output voltage of a charger should also be 5V, but a fast charging technology requires the charger to have a very high output voltage, for example, 10V or 20V. The output voltage may even reach 30V, 40V, or the like. However, existing chargers mainly use a power adjustment manner combining a flyback technology and a protocol control technology. This manner has a problem that charging efficiency is low.

SUMMARY

Embodiments of this application provide a charger.

This application is implemented as follows.

An embodiment of this application provides a charger, including:

- a first power input end, a second power input end, and a power output end;
- a switching module, where the switching module is separately connected to the first power input end and the second power input end; and
- a transformer, where a primary side of the transformer is provided with a first resonant unit, the first resonant unit is connected to the switching module, and a secondary-side winding of the transformer is connected to the power output end, where
- the switching module is capable of switching between a first on state and a second on state, where when the switching module is in the first on state, input power at the first power input end is coupled to the secondary-side winding through the first resonant unit and is output through the power output end; or when the switching module is in the second on state, power discharged by the first resonant unit is transmitted to the first power input end through the second power input end.

Therefore, in the foregoing solution of this application, the primary side of the transformer in the charger is provided with the first resonant unit and the switching module; and the switching module controls the first resonant unit, to ensure that the input power at the first power input end can be coupled to the secondary-side winding and output, and that power discharged during electric discharge can be transmitted to the first power input end through the second power input end, and then coupled to the secondary-side winding and output again. This reduces energy loss and improves charging efficiency.

DETAILED DESCRIPTION

Example embodiments of this application will be described below in further detail with reference to the accompanying drawings. Although the example embodiments of this application are illustrated in the accompanying drawings, it should be understood that this application may be implemented in various forms without being limited to the embodiments described herein. On the contrary, these embodiments are provided to help more thoroughly understand this application and to fully convey the scope of this application to those skilled in the art.

Figure 1:
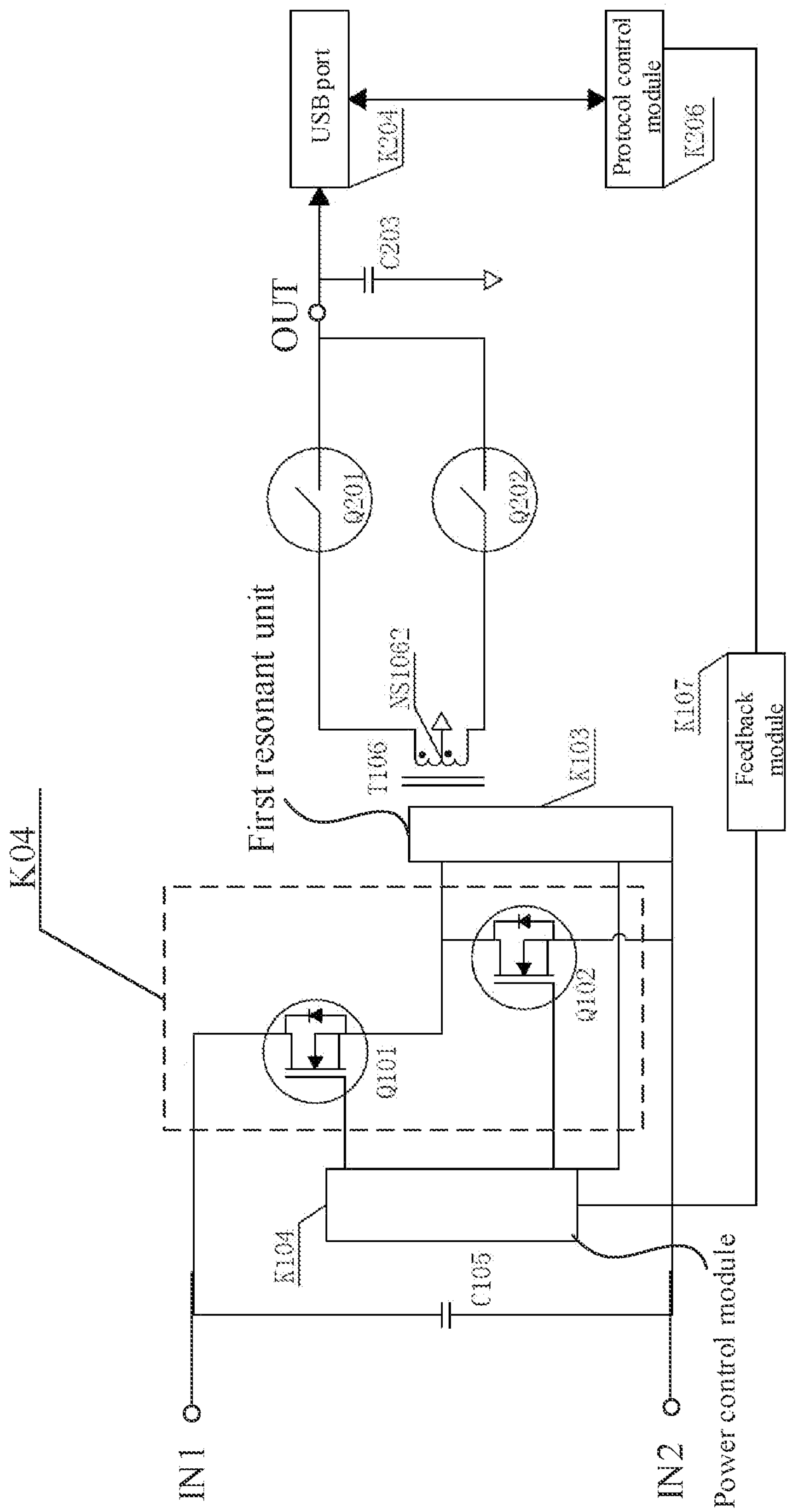
FIG. 1 is a first schematic diagram of a circuit structure of a charger according to an embodiment of this application.

As shown in FIG. 1, an embodiment of this application provides a charger, including: a first power input end IN1, a second power input end IN2, a power output end OUT, a switching module K04, and a transformer T106.

The switching module K04 is separately connected to the first power input end IN1 and the second power input end IN2. A primary side of the transformer T106 is provided with a first resonant unit K103. The first resonant unit K103 is connected to the switching module K04. A secondary-side winding NS1062 of the transformer T106 is connected to the power output end OUT.

The switching module K04 is capable of switching between a first on state and a second on state. When the switching module K04 is in the first on state, input power at the first power input end IN1 is coupled to the secondary-side winding NS1062 through the first resonant unit K103 and is output through the power output end OUT. When the switching module K04 is in the second on state, power discharged by the first resonant unit K103 is transmitted to the first power input end IN1 through the second power input end IN2.

For example, when the switching module K04 is in the first on state, an energy storage element in the first resonant unit K103 is in a charging state, and a flow direction of a current between the first power input end IN1 and the second power input end IN2 is: from the first power input end IN1 to the first resonant unit K103 and the second power input end IN2 sequentially; or when the switching module K04 is in the second on state, the energy storage element in the first resonant unit K103 is in a discharging state, and a flow direction of a current is: from the first resonant unit K103 to the second power input end IN2 and the first power input end IN1 sequentially.

In this way, a resonant topology can be formed in a charging circuit by alternately switching the switching module K04 between the first on state and the second on state. This can reduce loss and improve charging efficiency.

In some embodiments, the switching module K04 includes a first switch unit Q101 and a second switch unit Q102.

A first end of the first switch unit Q101 is connected to the first power input end IN1. A second end of the first switch unit Q101 is separately connected to a first end of the second switch unit Q102 and a first end of the first resonant unit K103. Both a second end of the second switch unit Q102 and a second end of the first resonant unit K103 are connected to the second power input end IN2.

When the switching module K04 is in the first on state, the first switch unit Q101 is in an on state, and the second switch unit Q102 is in an off state; or when the switching module K04 is in the second on state, the first switch unit Q101 is in an off state, and the second switch unit Q102 is in an on state.

In this embodiment, Q101 and Q102 constitute a half-bridge control switch, so that an entire architecture can constitute a resonant half-bridge topology in a case that Q101 and Q102 are controlled to be switched on and off alternately, thereby realizing efficient electric energy conversion.

Figure 2:
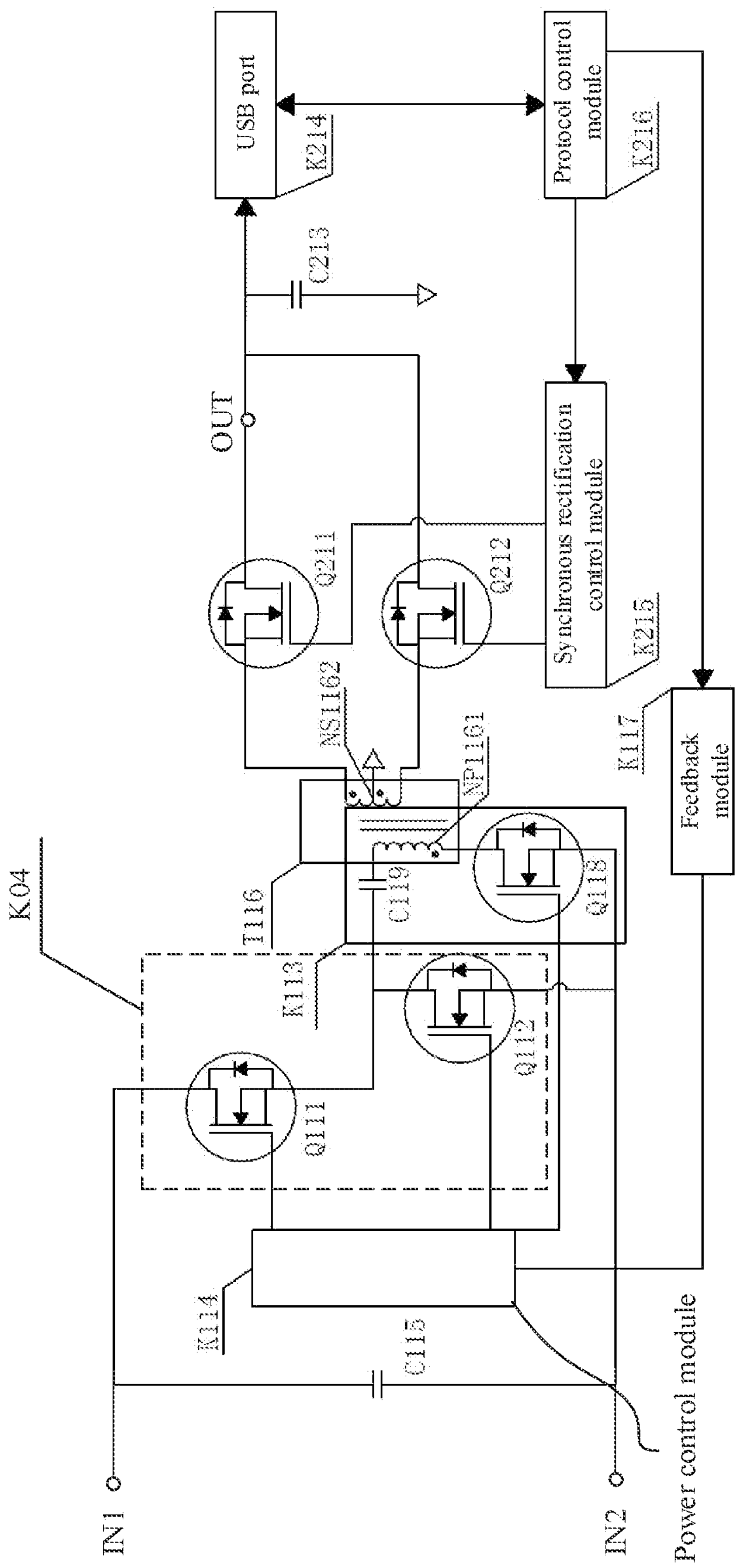
FIG. 2 is a second schematic diagram of a circuit structure of a charger according to an embodiment of this application.

As shown in FIG. 2, the first resonant unit K113 may include a first primary-side winding NP1161 and a first capacitor C119.

A first end of the first capacitor C119 is connected to the switching module K04. A second end of the first capacitor C119 is connected to a first end of the first primary-side winding NP1161. A second end of the first primary-side winding NP1161 is connected to the second power input end IN2.

In some embodiments, the first resonant unit K103 may further include a first switch element Q118. The second end of the first primary-side winding NP1161 is connected to the second power input end IN2 through the first switch element Q118.

In this way, working status of the first resonant unit K103 can be controlled by controlling on/off status of the first switch element Q118. For example, when the first switch element Q118 is in an on state, the first resonant unit K103 is in a working state; or when the first switch element Q118 is in an off state, the first resonant unit K103 is in a non-working state.

In some embodiments, the first switch element Q118 may be a switch component such as a MOS transistor, a triode, a silicon controlled rectifier, or a relay.

In some embodiments, the charger may further include: a first charging interface (for example, a USB port K214 in FIG. 2); a capacitor C115, disposed between the first power input end IN1 and the second power input end IN2; a power control module K114, separately connected to the switching module K04 and the first resonant unit K103; switching transistors Q211 and Q212, disposed on a secondary side of the transformer and connected to the secondary-side winding NS1162; a synchronous rectification control module K215, connected to Q211 and Q212; a protocol control module K216, connected to the synchronous rectification control module K215 and the first charging interface; and a feedback module K117, connected to the protocol control module K216 and the power control module K114.

A working process of the charger is described below with reference to the schematic diagram of the circuit structure of the charger shown in FIG. 2.

After the charger is powered on, the power control module K114 controls the first resonant unit K113 to be effectively turned on, and controls on/off status of Q111 and Q112, so that the transformer is enabled to output a voltage. In addition, the power control module K114 controls Q111 and Q112 to be switched on and off alternatively, so that a resonant topology can be formed in a charging circuit. This can reduce loss and improve charging efficiency.

After the protocol control module K216 is powered on, the feedback module K117 and a primary-side circuit jointly control a power supply to output a default voltage V0. The protocol control module K216 can adjust an output voltage V in a voltage range from V0 to V1.

When an electrical device (for example, a mobile phone) is connected to the charger through the USB port K214, the electrical device may transmit request information for requesting a voltage VP (which may be understood as a charging voltage required by the electrical device) to the protocol control module K216; and the protocol control module K216 requests, through the feedback module K117, the power control module K114 to output the voltage VP.

Figure 3:
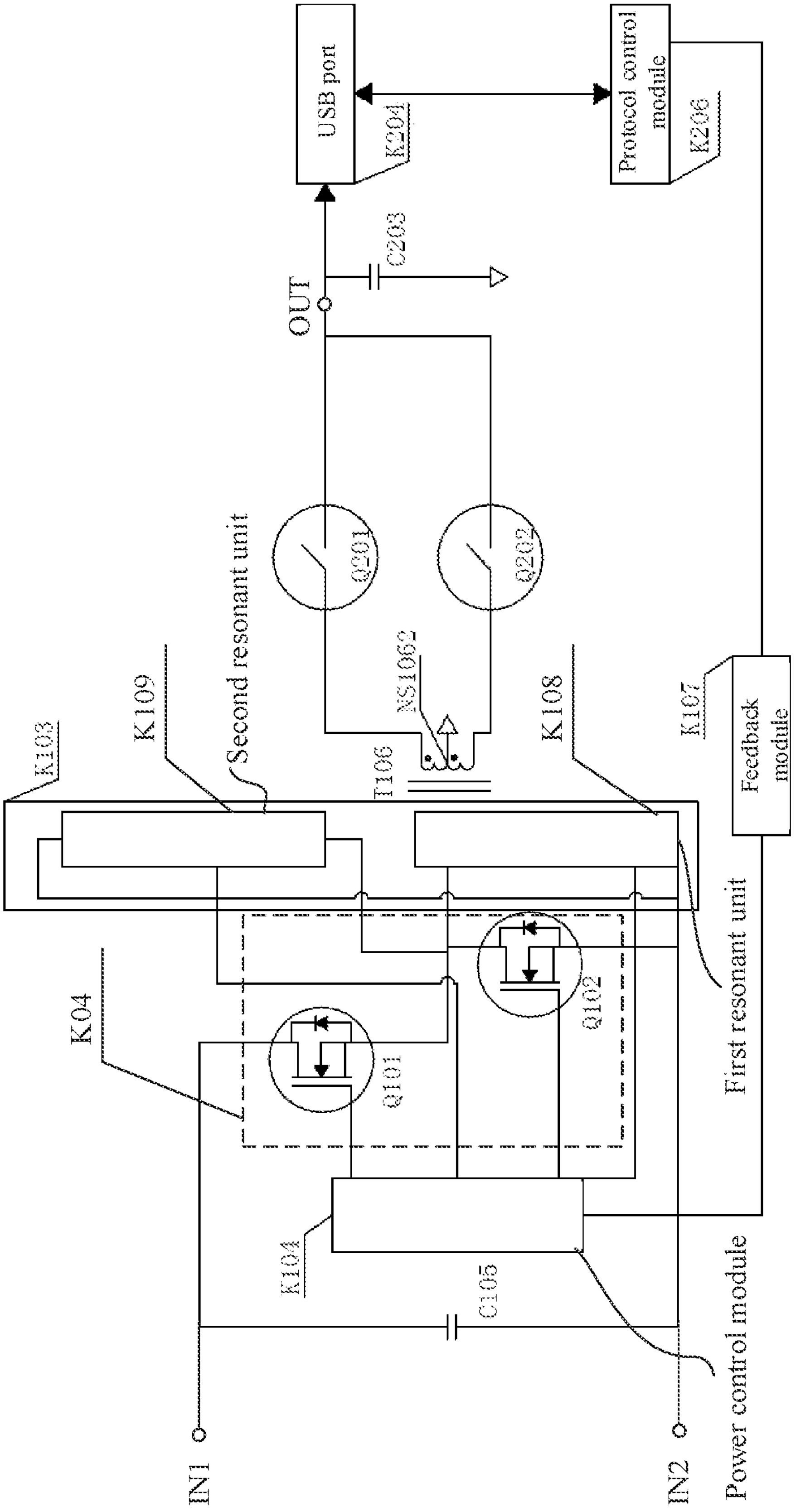
FIG. 3 is a third schematic diagram of a circuit structure of a charger according to an embodiment of this application.

In some embodiments, as shown in FIG. 3, the charger includes: a first power input end IN1, a second power input end IN2, a power output end OUT, a switching module K04, and a transformer T106.

The switching module K04 is separately connected to the first power input end IN1 and the second power input end IN2. A primary side of the transformer T106 is provided with a resonant module K103. A secondary-side winding NS1062 of the transformer T106 is connected to the power output end OUT.

The resonant module K103 includes a first resonant unit K108 and a second resonant unit K109. The first resonant unit K108 is connected to the switching module K04. The second resonant unit K109 is connected to the switching module K04. When the first resonant unit K108 is in a working state, the second resonant unit K109 is in a non-working state; or when the first resonant unit K108 is in a non-working state, the second resonant unit K109 is in a working state.

The switching module K04 is capable of switching between a first on state and a second on state. When the first resonant unit K108 is in the working state, if the switching module K04 is in the first on state, input power at the first power input end IN1 is coupled to the secondary-side winding NS1062 through the first resonant unit K108 and is output through the power output end OUT; or if the switching module K04 is in the second on state, power discharged by the first resonant unit K108 is transmitted to the first power input end IN1 through the second power input end IN2.

When the second resonant unit K109 is in the working state, if the switching module K04 is in the first on state, the input power at the first power input end IN1 is coupled to the secondary-side winding NS1062 through the second resonant unit K109 and is output through the power output end OUT; or if the switching module K04 is in the second on state, power discharged by the second resonant unit K109 is transmitted to the first power input end IN1 through the second power input end IN2.

Therefore, when any one of the first resonant unit K108 and the second resonant unit K109 is in the working state, a resonant topology can be formed in a charging circuit by alternately switching the switching module K04 between the first on state and the second on state. This can reduce loss and improve charging efficiency.

In some embodiments, when a required voltage fed back by an electrical device is in a range from a first voltage V1 to a second voltage V2, the first resonant unit K108 is in the working state, and the second resonant unit K109 is in the non-working state; or when the required voltage is in a range from a third voltage V3 to a fourth voltage V4, the first resonant unit K108 is in the non-working state, and the second resonant unit K109 is in the working state, where V3 is greater than V1, and V4 is greater than V2.

For example: a first voltage range is from V1 to V2; and a second voltage range is from V3 to V4. V3 is greater than V1, V4 is greater than V2, and V3 is less than V2. In other words, a voltage return difference may be set between the first voltage range and the second voltage range, to avoid frequent switching of the switching module. Alternatively, V3 is greater than V1, V4 is greater than V2, and V3 is greater than or equal to V2. In this case, a total output voltage range of the charger is a combination of the first voltage range (V1 to V2) and the second voltage range (V3 to V4), so that a wide output voltage range is obtained. Quantities of turns of primary-side windings in different resonant units may be set according to corresponding output voltage ranges.

Figure 4:
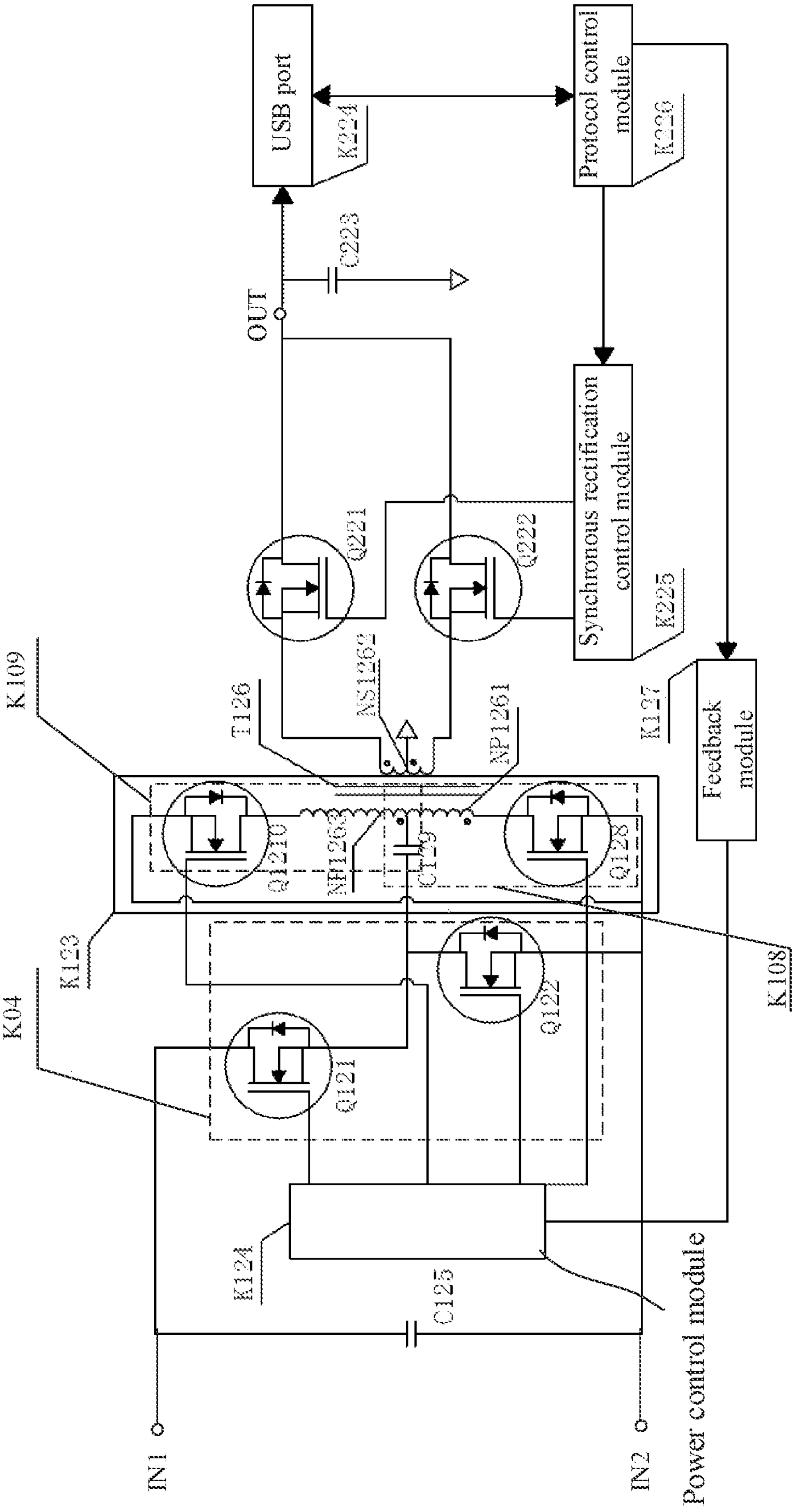
FIG. 4 is a fourth schematic diagram of a circuit structure of a charger according to an embodiment of this application.

In some embodiments, as shown in FIG. 4, the first resonant unit K108 may include a first switch element Q128, and the second resonant unit K109 may include a second switch element Q1210.

The charger may further include a power control module K124. The power control module K124 is separately connected to the first switch element Q128 and the second switch element Q1210.

The power control module K124 is configured to: control one of the first switch element Q128 and the second switch element Q1210 to be in an on state and control the other one to be in an off state. When the first switch element Q128 is in the on state, the first resonant unit K108 is in the working state, and the second resonant unit K109 is in the non-working state; or when the second switch element Q1210 is in the on state, the second resonant unit K109 is in the working state, and the first resonant unit K108 is in the non-working state.

In this way, working status of the first resonant unit K108 and the second resonant unit K109 can be controlled by controlling on/off status of the first switch element Q128 and the second switch element Q1210. For example, when the first switch element Q128 is in the on state, the first resonant unit K108 is in the working state; or when the first switch element Q128 is in the off state, the first resonant unit K108 is in the non-working state. When the second switch element Q1210 is in the on state, the second resonant unit K109 is in the working state; or when the second switch element Q1210 is in the off state, the second resonant unit K109 is in the non-working state.

In some embodiments, the first switch element Q128 may be a switch component such as a MOS transistor, a triode, a silicon controlled rectifier, or a relay; and the second switch element Q1210 may be a switch component such as a MOS transistor, a triode, a silicon controlled rectifier, or a relay.

In some embodiments, when the charger charges an electrical device, the power control module K124 is configured to obtain a required voltage fed back by the electrical device. When the required voltage is in a range from a first voltage V1 to a second voltage V2, the power control module K124 controls the first switch element Q128 to be in the on state, and controls the second switch element Q1210 to be in the off state; or when the required voltage is in a range from a third voltage V3 to a fourth voltage V4, the power control module K124 controls the first switch element Q128 to be in the off state, and controls the second switch element Q1210 to be in the on state, where V3 is greater than V1, and V4 is greater than V2. For example, for a relationship between the voltage range V1 to V2 and the voltage range V3 to V4, reference may be made to the foregoing embodiment. To avoid repetition, details are not described herein again.

In some embodiments, the charger may further include: a first charging interface (for example, a USB port K224 in FIG. 4) and a protocol control module K226. The first charging interface is connected to the power output end OUT. The protocol control module K226 is separately connected to the first charging interface and the power control module K124.

In a case that the first charging interface is connected to a second charging interface of the electrical device, the protocol control module K226 obtains the required voltage fed back by the electrical device, and feeds back the required voltage to the power control module K124.

In this way, due to a coordinated function of the power control module K124 and the protocol control module K226, the charger can output voltages meeting different charging requirements, thereby improving charging applicability.

In some embodiments, the first resonant unit K108 further includes a first primary-side winding NP1261 and a first capacitor C129, and the second resonant unit K109 further includes a second primary-side winding NP1263.

A first end of the first capacitor C129 is connected to the switching module K04. A second end of the first capacitor C129 is separately connected to a first end of the first primary-side winding NP1261 and a first end of the second primary-side winding NP1263. A second end of the first primary-side winding NP1261 is connected to the second power input end IN2 through the first switch element Q128. A second end of the second primary-side winding NP1263 is connected to the second power input end IN2 through the second switch element Q1210.

In some embodiments, the charger may further include: a capacitor C125, disposed between the first power input end IN1 and the second power input end IN2; switching transistors Q221 and Q222, disposed on a secondary side of the transformer and connected to the secondary-side winding NS1262; a synchronous rectification control module K225, connected to Q221 and Q222; and a feedback module K127, connected to the protocol control module K226 and the power control module K124.

A working process of the charger is described below with reference to the schematic diagram of the circuit structure of the charger shown in FIG. 4.

After the charger is powered on, the power control module K114 controls a resonant module K123 to be effectively turned on, and controls on/off status of Q121 and Q122, so that the transformer is enabled to output a voltage. In addition, the power control module K124 controls Q121 and Q122 to be switched on and off alternatively, so that a resonant topology can be formed in a charging circuit. This can reduce loss and improve charging efficiency.

After the protocol control module K226 is powered on, the feedback module K127 and a primary-side circuit jointly control a power supply to output a default voltage V0. The protocol control module K226 can adjust an output voltage V in a voltage range from V0 to V1.

When an electrical device (for example, a mobile phone) is connected to the charger through the USB port K224, the electrical device transmits request information for requesting a voltage VP (which may be understood as a charging voltage required by the electrical device) to the protocol control module K226; and the protocol control module K226 requests, through the feedback module K127, the power control module K124 to output the voltage VP.

If the voltage VP requested by the electrical device exceeds a voltage range 1 (V0 to V1) of an output voltage V, the first resonant unit K108 of the resonant module K123 is turned off, and the second resonant unit K109 is used for working; and after switching is performed to the second resonant unit K109 for working, a voltage range 2 of the output voltage V is from V1 to V2.

In this case, the voltage range 1 plus the voltage range 2 equals a total output voltage range of the charger, so that a wide output voltage range (V0 to V2) is obtained.

An exemplary working process is as follows.

After the charger is powered on, the power control module K124 controls Q128 to be in the on state, controls Q1210 to be in the off state, and controls the switching transistors Q121 and Q122 to be in the on state and the off state alternately during work. In this case, C129, NP1261, and Q128 constitute a first resonant unit K108 in a working state. NP1263 and a junction capacitor of Q1210 are combined to form a non-working resonant cavity that is used as a shielded winding to absorb interference. The charger outputs the voltage V0 by default.

After the charger is connected to the electrical device, the protocol control module K226 communicates with the electrical device through the USB port K224, and feeds back a corresponding signal to the power control module K124 based on the request of the electrical device, thereby requesting the voltage VP meeting the request of the electric device. The power control module K124 is provided with a preset voltage range. A resonant unit for working is selected based on the voltage VP requested by the electrical device.

When the requested voltage meets the following condition: V0≤voltage VP≤V1, the first resonant unit K108 is controlled to be in the working state. When the requested voltage meets the following condition: V1<voltage VP≤V2, a second resonant cavity unit K109 is controlled to be in a working state.

When the second resonant cavity unit K109 is in the working state, the power control module K124 controls Q128 to be in the off state, controls Q1210 to be in the on state, and controls the switching transistors Q121 and Q122 to be in the on state and the off state alternately during work. In this case, C129, NP1263, and Q1210 constitute the second resonant cavity unit K109 in the working state. NP1261 and a junction capacitor of Q128 are combined to form a non-working resonant cavity that is used as a shielded winding to absorb interference.

In some embodiments, a voltage return difference AV may also be set between the voltage range 1 and the voltage range 2. For example, when a voltage is adjusted and increased from the voltage range 1 (V0 to V1) to the voltage range 2 (V1 to V2), switching starts only when the voltage becomes greater than $V1+½*\Delta V$; or when the voltage is adjusted and decreased from the voltage range 2 (V1 to V2) to the voltage range 1 (V0 to V1), switching starts only when the voltage becomes greater than $V1-½*\Delta V$.

According to the foregoing solution, outputting of different voltages is controlled by controlling use of different resonant units, and a plurality of voltages constitute a wide output voltage range, thereby broadening a voltage range of resonant half-bridge output voltages. Therefore, this embodiment can be applied to a charger with a wide output voltage range, and is characterized in that there is nearly no energy loss. This implements a power supply design with an efficient and wide output voltage range.

Figure 5:
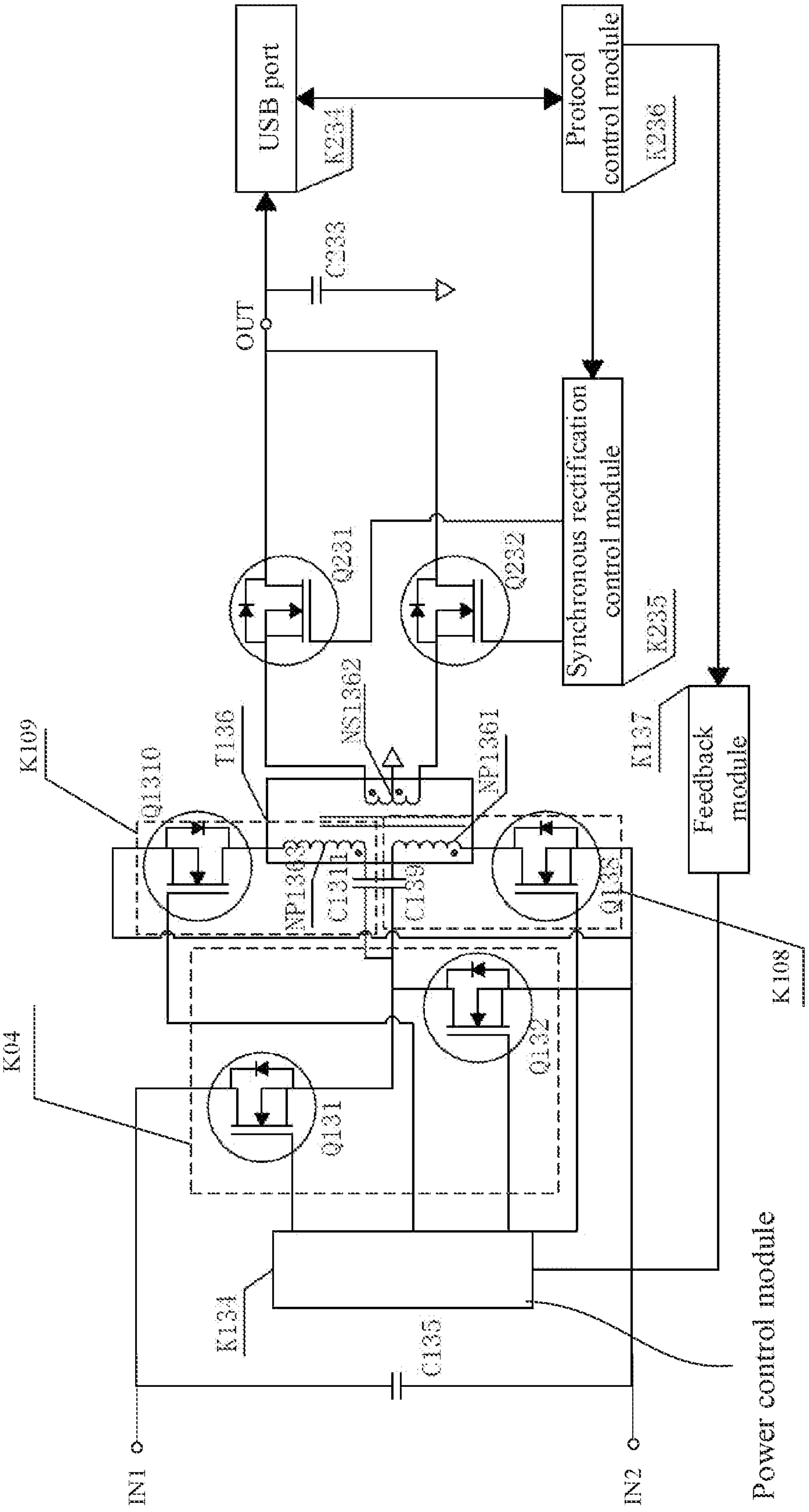
FIG. 5 is a fifth schematic diagram of a circuit structure of a charger according to an embodiment of this application.

In some embodiments, as shown in FIG. 5, the first resonant unit K108 may further include a first primary-side winding NP1361 and a first capacitor C139.

A first end of the first capacitor C139 is connected to the switching module K04. A second end of the first capacitor C139 is connected to a first end of the first primary-side winding NP1361. A second end of the first primary-side winding NP1361 is connected to the second power input end IN2 through the first switch element Q138.

In some embodiments, the second resonant unit K109 further includes a second primary-side winding NP1363 and a second capacitor C1311.

A first end of the second capacitor C1311 is connected to the switching module K04. A second end of the second capacitor C1311 is connected to a first end of the second primary-side winding NP1363. A second end of the second primary-side winding NP1363 is connected to the second power input end IN2 through the second switch element Q1310.

In this embodiment, the first resonant unit K108 and the second resonant unit K109 are independent of each other, that is, the first resonant unit K108 has the first primary-side winding NP1361 and the first capacitor C139 that are independent, and the second resonant unit K109 has the second primary-side winding NP1363 and the second capacitor C1311 that are independent. This can reduce difficulty of selecting a capacitor from a resonant unit, thus making a design simpler.

Moreover, in this embodiment, other structures different from the structures of the first resonant unit K108 and the second resonant unit K109 as well as corresponding working principles are similar to the foregoing embodiments. To avoid repetition, details are not described herein again.

It should be noted that although this embodiment of this application provides an example in which two resonant units are used, it should be understood that a quantity of resonant units in the solution of this application may be extended to a larger number, so that in addition to higher efficiency, the charger also has a wider output voltage range. Embodiments of this application are not limited thereto.

It should be noted that the embodiments of this application can be applied to similar power supply devices, so that a power supply can have an efficient and wide output voltage range. This application is not limited thereto.

The embodiments in this specification are described in a progressive manner. Each embodiment focuses on a difference from another embodiment. For same or similar parts in the embodiments, refer to each other.

Although some embodiments of this application have been described, those skilled in the art may make additional changes and modifications to these embodiments once they learn the basic inventive concept. Therefore, the appended claims are intended to be interpreted as including the embodiments and all changes and modifications that fall within the scope of the embodiments of this application.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise", or any of their variants are intended to cover a non-exclusive inclusion, so that a process, a method, an article, or a terminal device that includes a list of elements not only includes those elements but also includes other elements that are not listed, or further includes elements inherent to such a process, method, article, or terminal device. Without further restrictions, an element defined by the statement "including a . . . " does not exclude the existence of another identical element in the process, method, article, or terminal device that includes the very element.

The above embodiments are exemplary embodiments of this application. It should be noted that, within the technical concept of this application, those ordinarily skilled in the art can make various improvements and modifications, which shall all fall within the protective scope of this application.

What is claimed is:

1. A charger, comprising:
a first power input end;
a second power input end;
a power output end;
a switching module separately connected to the first power input end and the second power input end; and
a transformer, wherein a primary side of the transformer is provided with a first resonant unit connected to the switching module, and a secondary-side winding of the transformer is connected to the power output end, wherein
the switching module is configured to switch between a first on state in which input power at the first power input end is coupled to the secondary-side winding through the first resonant unit and is output through the power output end and a second on state in which power discharged by the first resonant unit is transmitted to the first power input end through the second power input end.

2. The charger according to claim 1, wherein the switching module comprises:
a first switch unit and a second switch unit,
wherein:
a first end of the first switch unit is connected to the first power input end,
a second end of the first switch unit is separately connected to a first end of the second switch unit and a first end of the first resonant unit, and
both a second end of the second switch unit and a second end of the first resonant unit are connected to the second power input end; and
wherein:
when the switching module is in the first on state, the first switch unit is in an on state, and the second switch unit is in an off state, or
when the switching module is in the second on state, the first switch unit is in an off state, and the second switch unit is in an on state.

3. The charger according to claim 1, further comprising:
a second resonant unit connected to the switching module, wherein:
when the first resonant unit is in a working state, the second resonant unit is in a non-working state; or when the first resonant unit is in a non-working state, the second resonant unit is in a working state, and
when the switching module is in the first on state, the input power at the first power input end is coupled to the secondary-side winding through the second resonant unit and is output through the power output end; or when the switching module is in the second on state, power discharged by the second resonant unit is transmitted to the first power input end through the second power input end.

4. The charger according to claim 3, wherein:
the first resonant unit comprises a first switch element, and the second resonant unit comprises a second switch element;
the charger further comprises a power control module separately connected to the first switch element and the second switch element; and
the power control module is configured to: control one of the first switch element and the second switch element to be in an on state and control the other one of the first switch element and the second switch element to be in an off state, wherein:
when the first switch element is in the on state, the first resonant unit is in the working state, and the second resonant unit is in the non-working state; or
when the second switch element is in the on state, the second resonant unit is in the working state, and the first resonant unit is in the non-working state.

5. The charger according to claim 4, wherein when the charger charges an electrical device, the power control module is configured to obtain a required voltage fed back by the electrical device; and
wherein:
when the required voltage is in a range from a first voltage V1 to a second voltage V2, the power control module controls the first switch element to be in the on state, and controls the second switch element to be in the off state; or
when the required voltage is in a range from a third voltage V3 to a fourth voltage V4, the power control module controls the first switch element to be in the off state, and controls the second switch element to be in the on state, wherein V3 is greater than V1, and V4 is greater than V2.

6. The charger according to claim 5, further comprising:
a first charging interface connected to the power output end; and
a protocol control module separately connected to the first charging interface and the power control module, wherein
when the first charging interface is connected to a second charging interface of the electrical device, the protocol control module obtains the required voltage fed back by the electrical device, and feeds back the required voltage to the power control module.

7. The charger according to claim 4, wherein the first resonant unit further comprises a first primary-side winding and a first capacitor,
wherein:
a first end of the first capacitor is connected to the switching module,
a second end of the first capacitor is connected to a first end of the first primary-side winding, and
a second end of the first primary-side winding is connected to the second power input end through the first switch element.

8. The charger according to claim 7, wherein the first switch element is a switching transistor, and the second switch element is another switching transistor.

9. The charger according to claim 4, wherein the second resonant unit further comprises a second primary-side winding and a second capacitor,
wherein:
a first end of the second capacitor is connected to the switching module,
a second end of the second capacitor is connected to a first end of the second primary-side winding, and
a second end of the second primary-side winding is connected to the second power input end through the second switch element.

10. The charger according to claim 9, wherein the first switch element is a switching transistor, and the second switch element is another switching transistor.

11. The charger according to claim 4, wherein the first resonant unit further comprises a first primary-side winding and a first capacitor, and the second resonant unit further comprises a second primary-side winding, wherein:

a first end of the first capacitor is connected to the switching module, a second end of the first capacitor is separately connected to a first end of the first primary-side winding and a first end of the second primary-side winding, a second end of the first primary-side winding is connected to the second power input end through the first switch element, and a second end of the second primary-side winding is connected to the second power input end through the second switch element.

12. The charger according to claim 11, wherein the first switch element is a switching transistor, and the second switch element is another switching transistor.

* * * * *